US012750155B2

(12) United States Patent
Li et al.

(10) Patent No.: US 12,750,155 B2
(45) Date of Patent: Sep. 29, 2026

(54) ADAPTIVE DATA RATE METHODS OF COMMUNICATION DEVICE FOR ACHIEVING HIGH THROUGHPUT

(71) Applicant: Realtek Semiconductor Corp., HsinChu (TW)

(72) Inventors: Zhaoming Li, Suzhou City (CN); Huifang Yu, Suzhou City (CN); Jing Zhang, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 100 days.

(21) Appl. No.: 18/908,761

(22) Filed: Oct. 7, 2024

(65) Prior Publication Data

US 2025/0150196 A1 May 8, 2025

(30) Foreign Application Priority Data

Nov. 8, 2023 (CN) ......................... 202311481803.9
Feb. 27, 2024 (CN) ......................... 202410217453.3

(51) Int. Cl.
*H04L 1/00* (2006.01)
*H04L 5/00* (2006.01)

(52) U.S. Cl.
CPC .......... *H04L 1/0002* (2013.01); *H04L 1/0025* (2013.01); *H04L 5/0048* (2013.01)

(58) Field of Classification Search
CPC ... H04L 1/0002; H04L 1/0025; H04L 5/0048; H04L 1/0015; H04L 1/0034
USPC .......................................................... 714/726
See application file for complete search history.

(56) References Cited

U.S. PATENT DOCUMENTS 9,462,575 B2 * 10/2016 Vermani .................. H04L 1/08
2009/0319854 A1 * 12/2009 Qian ..................... H04L 1/1692 714/E11.131
2010/0232437 A1 * 9/2010 Bajpai ................... H04L 1/1628 714/E11.131
2016/0294505 A1 * 10/2016 Turner .................. H04L 1/0002
2023/0171196 A1 6/2023 Mani

* cited by examiner

*Primary Examiner* — James C Kerveros
(74) *Attorney, Agent, or Firm* — Winston Hsu

(57) ABSTRACT

An adaptive data rate method for use in a communication device. The communication device includes a controller and a transceiver coupled to each other. The method includes the controller increasing an initial data rate to generate a test data rate, and the transceiver transmitting a test packet according to the test data rate, a packet length of the test packet being less than a maximum packet length of a data packet. The method further includes the controller selecting one from the initial data rate and the test data rate as a selected data rate according to a transmission result of the test packet, and the transceiver transmitting the data packet according to the selected data rate.

10 Claims, 6 Drawing Sheets

ADAPTIVE DATA RATE METHODS OF COMMUNICATION DEVICE FOR ACHIEVING HIGH THROUGHPUT

BACKGROUND OF THE INVENTION

1. Field of the Invention

The present invention relates to a communication network, especially to adaptive data rate methods of a communication device in the communication network for achieving the high throughput.

2. Description of the Prior Art

Wi-Fi networks facilitate efficient and convenient wireless data communication, acting as the primary method for transmitting data. The Wi-Fi networks are now ubiquitous, serving not only homes and offices but also public spaces, commercial establishments, and urban areas. However, due to the dynamic nature of wireless environments, where signal strength and interference levels fluctuate over time, adhering to a fixed data rate can lead to transmission failures.

SUMMARY OF THE INVENTION

According to an embodiment of the invention, an adaptive data rate method for use in a communication device is disclosed. The communication device includes a controller and a transceiver coupled to each other. The method includes the controller increasing an initial data rate to generate a test data rate, and the transceiver transmitting a test packet according to the test data rate, a packet length of the test packet being less than a maximum packet length of a data packet. The method further includes the controller selecting one from the initial data rate and the test data rate as a selected data rate according to a transmission result of the test packet, and the transceiver transmitting the data packet according to the selected data rate.

According to another embodiment of the invention, an adaptive data rate method for use in a communication device is disclosed. The communication device includes a controller and a transceiver coupled to each other. The method includes the transceiver transmitting a data packet according to an initial data rate, if the transmission of the test packet fails, and the transceiver transmitting a test packet according to a test data rate, where a packet length of the test packet is less than a maximum packet length of the data packet, and the test data rate is less than or equal to the initial data rate. The method further includes the controller determining whether to transmit the data packet or the test packet according to a transmission result of the test packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
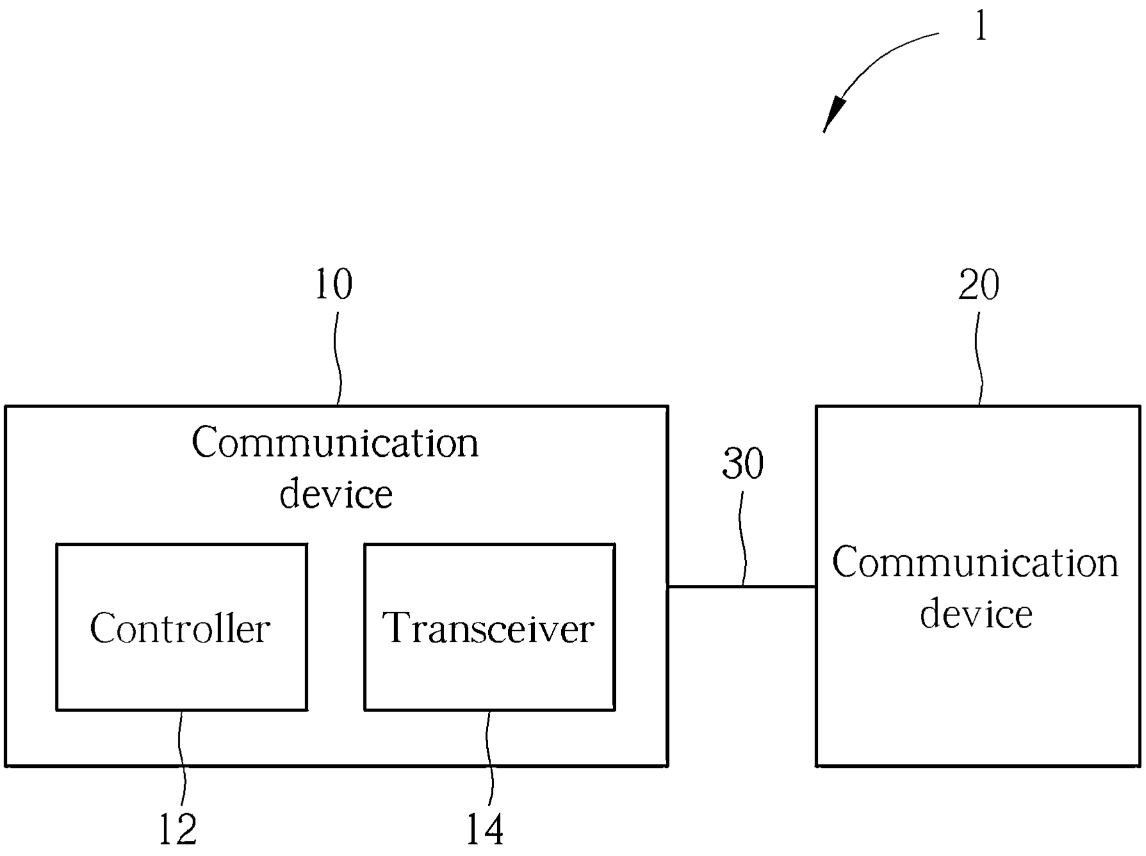
FIG. 1 is a block diagram of a communication network.

FIG. 1 is a block diagram of a communication network 1. The communication network 1 may include a communication device 10 and a communication device 20. The communication device 10 and the communication device 20 may transmit or receive packets via the wireless connection 30 for data transmission. The communication network 1 may be a Wi-Fi network, the communication device 10 and the communication device 20 may be Wi-Fi devices, and the wireless connection 30 may be a Wi-Fi link. In some embodiments, the communication device 10 may either be a Wi-Fi access point or a Wi-Fi station, while the communication device 12 may be the other. The communication device 10 may adopt an adaptive data rate method. When the wireless environment changes, a trial run may be performed by transmitting test packets at a new data rate. The new data rate is then used to transmit data packets if the trial run is successful. This approach effectively reduces the time of the trial run and ensures successful transmission of data packets at the test data rate, thereby achieving a high throughput.

The communication device 10 may include a controller 12 and a transceiver 14 coupled to each other. The circuit configuration and operation of the communication device 20 may be similar to the communication device 10. The wireless environment, such as signal strength and noise interference, can change over time. To ensure effective data transmission in varying wireless environment, the controller 12 may dynamically adjust the initial data rate according to changes in the wireless environment to generate a test data rate. The transceiver 14 may then transmit a test packet at the test data rate in a trial run. The packet length of the test packet is less than the maximum packet length of the data packet. The maximum packet length of the data packet may be 1542 bytes. The test packet may be a null packet, a management packet, a control packet, or a data packet having a packet length less than 1542 bytes. When the wireless environment improves, the controller 12 may increase the initial data rate to generate the test data rate. Conversely, when the wireless environment deteriorates, the controller 12 may reduce the initial data rate to generate the test data rate. After the test packet is successfully transmitted, the transceiver 14 may then transmit the data packet at the test data rate. If the test packet transmission fails, the transceiver 14 may continue to transmit the data packet at the initial data rate. Alternatively, the controller 12 may continuously adjust the test data rate until the transmission of the test packet is successful, and the transceiver 14 may transmit the data packet at the successful test data rate. Since the time for transmitting the test packet is shorter than that for a full data packet, the communication device 10 may quickly assessing the viability of the test data rate, thereby enhancing the throughput. The packet length of a null packet may be 28 bytes.

Figure 3:
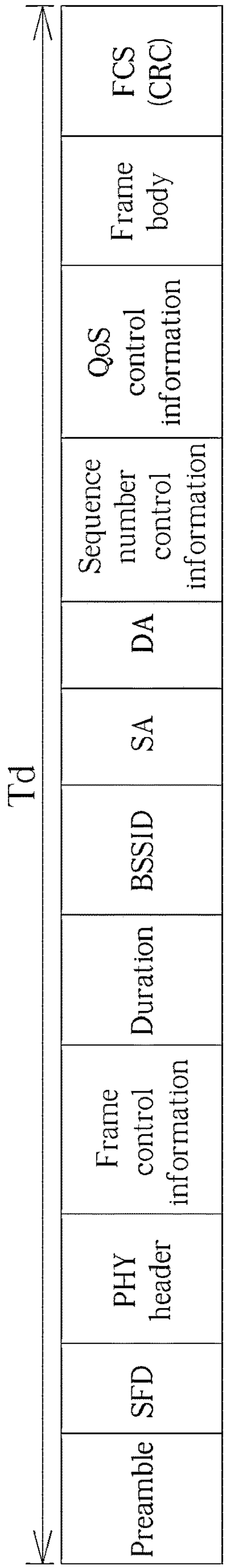
FIG. 3 shows the frame format of a Wi-Fi data frame.
Figure 4:
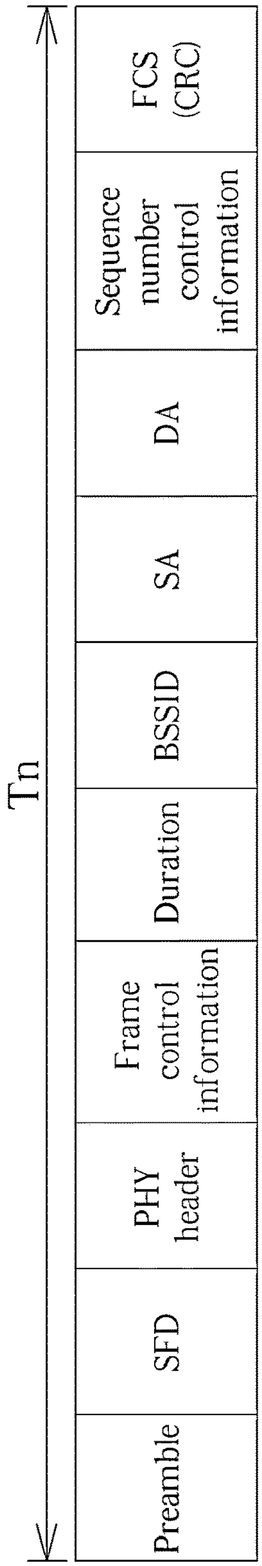
FIG. 4 shows the frame format of a Wi-Fi null frame.

FIGS. 3 and 4 show the frame formats of a data packet and a null packet, respectively. In FIG. 3, the data packet includes a preamble, a start frame delimiter (SFD), a physical layer (PHY) header, a frame control information, a duration, a basic service set identifier (BSSID), a source address (SA), a destination address (DA), sequence number control information, quality of service (QoS) control information, a frame body, and a frame check sequence (FCS) number, where the FCS number is used for the cyclic redundancy check (CRC) of the Wi-Fi data frame. The packet length Td of the data packet may range from 0 to 1542 bytes. In FIG. 4, the null packet includes all fields in the data packet except the QoS control information and the frame body. Therefore, the packet length of the null packet is shorter than the packet length of the data packet. The packet length Tn of the null packet may be 28 bytes, less than the maximum packet length of the data packet (28<1542). Using the null packet as the test packet may effectively reduce the time of the trial runs, while ensuring successful transmission of the data packet at the test data rate, thereby achieving a high throughput.

Figure 2:
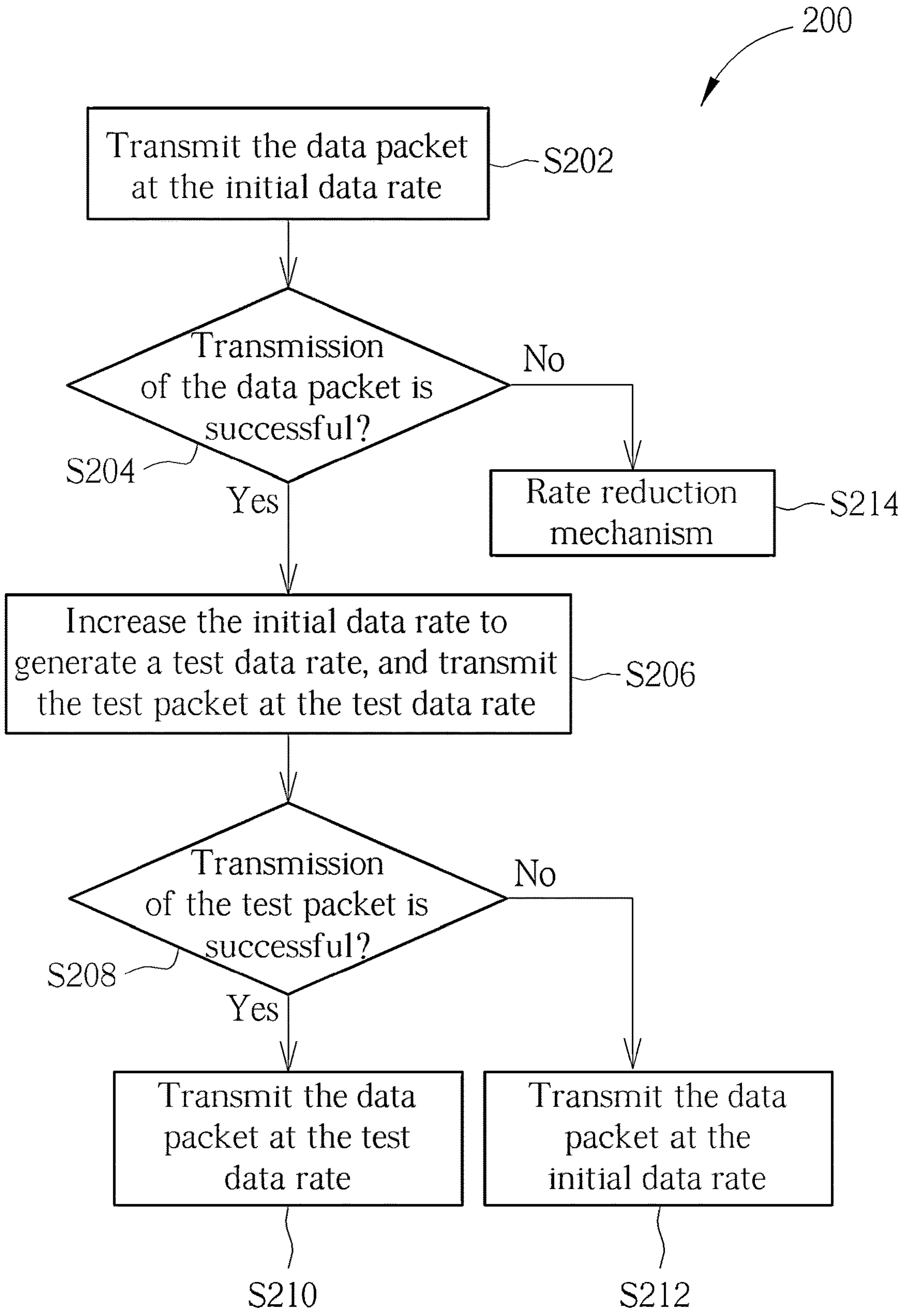
FIG. 2 is a flowchart of an adaptive data rate method of the communication device in FIG. 1.

FIG. 2 is a flowchart of the adaptive data rate method 200 of the communication device 10. The method 200 includes Steps S202 to S214, where Steps S202 and S204 are used to assess the wireless environment condition, Steps S206 to S212 are used to determine the data rate for transmitting the data packet when the wireless environment improves, and Step S214 is used to determine the data rate for transmitting the data packet when the wireless environment deteriorates. Any reasonable step change or adjustment is within the scope of the disclosure. Steps S202 to S214 are detailed as follows:

Step S202: The transceiver 14 transmits the data packet at the initial data rate;

Step S204: The controller 12 determines whether the transmission of the data packet is successful? if so, proceed to Step S206; if not, proceed to Step S214;

Step S206: The controller 12 increases the initial data rate to generate a test data rate, and the transceiver 14 transmits the test packet at the test data rate;

Step S208: The controller 12 determines whether the transmission of the test packet is successful? if so, proceed to Step S210; if not, proceed to Step S212;

Step S210: The transceiver 14 transmits the data packet at the test data rate;

Step S212: The transceiver 14 transmits the data packet at the initial data rate;

Step S214: The controller 12 performs a rate reduction mechanism.

Figure 7:
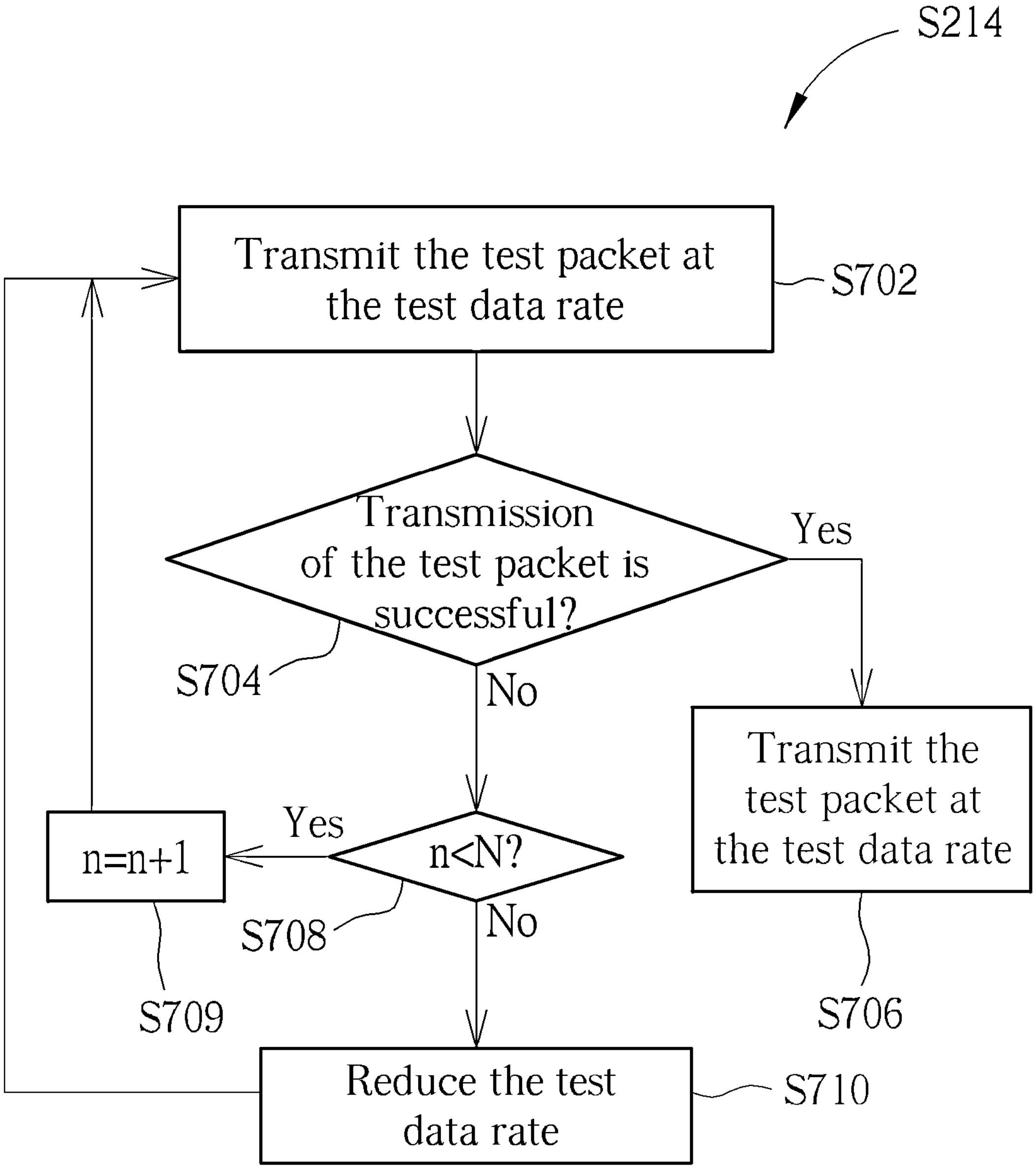
FIG. 7 is a flowchart of the rate reduction mechanism in the adaptive data rate method in FIG. 2.

In Step S204, the controller 12 determines the wireless environment condition according to the transmission result of the data packet. If the transmission of the data packet fails (unsuccessful transmission), it indicates that the wireless environment is unfavorable, thus proceed to Step S214, the controller 12 performs a rate reduction mechanism as shown in FIG. 7. The rate reduction mechanism will be explained in detail in subsequent paragraphs.

If the transmission of the data packet is successful, the wireless environment is favorable, thus proceed to Step S206. In Step S206, the controller 12 may increase the initial data rate according to the modulation and coding scheme (MCS) rate to generate a test data rate, and then the transceiver 14 transmits the test packet at the test data rate. Each MCS rate is represented by an MCS rate number corresponding to a specific modulation and coding scheme. The PHY rate for each MCS rate number may be calculated according the specific modulation and coding scheme listed in the data rate lookup table. The MCS rate number may be thought of as a "level" for adjusting the rate. When the channel condition is favorable, the communication device 10 will increase the rate from a low MCS level to a high MCS level, effectively using a higher modulation and coding scheme for transmission.

In some embodiments, the controller 12 may search from the data rate lookup table (e.g., any one from Tables 1 to 4) according to a MCS rate that is higher than the current MCS rate, so as to obtain the corresponding PHY rate to be used as the test data rate. Table 1 shows the data rate lookup table for the IEEE802.11a standard, Table 2 shows the data rate lookup table for the IEEE802.11n standard (also referred to as high throughput (HT) technology), Table 3 shows the data rate lookup table for the IEEE802.11ac standard (also referred to as very high throughput (VHT) technology), and Table 4 shows the data rate lookup table for the IEEE802.11ax standard (also referred to as high efficiency (HE) technology). The controller 12 may find the PHY rate corresponding to the higher MCS rate from one of Tables 1 to 4 according to the wireless network technology adopted by the communication device 10, thereby increasing the initial data rate to generate the test data rate. Tables 1 to 4 only serve as examples but are not to limit the scope of the invention. Those skilled in the art may use other data rate lookup tables (e.g., the data rate lookup table from https://semfionetworks.com/blog/mc) to generate the test data rates based on actual requirements without departing from the principle of the present invention.

TABLE 1

| MCS rate | PHY rate (Mbps) |
|---|---|
| RATE_CCK_1M | 1 |
| RATE_CCK_2M | 2 |
| RATE_CCK_5M | 5.5 |
| RATE_CCK_11M | 11 |
| RATE_OFDM_6M | 6 |
| RATE_OFDM_9M | 9 |
| RATE_OFDM_12M | 12 |
| RATE_OFDM_18M | 18 |
| RATE_OFDM_24M | 24 |
| RATE_OFDM_36M | 36 |
| RATE_OFDM_48M | 48 |
| RATE_OFDM_54M | 54 |

TABLE 2

| | PHY rate (Mbps) | |
|---|---|---|
| MCS rate | 0.8 μs GI | 0.4 μs GI |
| RATE_HT_MCS0 | 6.5 | 7.1 |
| RATE_HT_MCS1 | 13 | 14.4 |
| RATE_HT_MCS2 | 19.5 | 21.7 |
| RATE_HT_MCS3 | 26 | 28.9 |
| RATE_HT_MCS4 | 39 | 43.3 |
| RATE_HT_MCS5 | 52 | 57.8 |
| RATE_HT_MCS6 | 58.5 | 65 |
| RATE_HT_MCS7 | 65 | 72.2 |

TABLE 3

| | PHY rate (Mbps) | |
|---|---|---|
| MCS rate | 0.8 μs GI | 0.4 μs GI |
| RATE_VHT1SS_MCS0 | 6.5 | 7.2 |
| RATE_VHT1SS_MCS1 | 13 | 14.4 |
| RATE_VHT1SS_MCS2 | 19.5 | 21.7 |
| RATE_VHT1SS_MCS3 | 26 | 28.9 |

TABLE 3-continued

| MCS rate | PHY rate (Mbps) 0.8 μs GI | 0.4 μs GI |
|---|---|---|
| RATE_VHT1SS_MCS4 | 39 | 43.3 |
| RATE_VHT1SS_MCS5 | 52 | 57.8 |
| RATE_VHT1SS_MCS6 | 58.5 | 65 |
| RATE_VHT1SS_MCS7 | 65 | 72.2 |
| RATE_VHT1SS_MCS8 | 78 | 86.7 |

TABLE 4

| MCS rate | PHY rate (Mbps) | | |
|---|---|---|---|
| | 0.8 μs GI | 1.6 μs GI | 3.2 μs GI |
| RATE_HE_NSS1_MCS0 | 8.6 | 8.1 | 7.3 |
| RATE_HE_NSS1_MCS1 | 17.2 | 16.3 | 14.6 |
| RATE_HE_NSS1_MCS2 | 25.8 | 24.4 | 21.9 |
| RATE_HE_NSS1_MCS3 | 34.4 | 32.5 | 29.3 |
| RATE_HE_NSS1_MCS4 | 51.6 | 48.8 | 43.9 |
| RATE_HE_NSS1_MCS5 | 68.8 | 65 | 58.5 |
| RATE_HE_NSS1_MCS6 | 77.4 | 73.1 | 65.8 |
| RATE_HE_NSS1_MCS7 | 86 | 81.3 | 73.1 |
| RATE_HE_NSS1_MCS8 | 103.2 | 97.5 | 87.8 |
| RATE_HE_NSS1_MCS9 | 114.7 | 108.3 | 97.5 |

For example, if the communication device 10 adopts the IEEE802.11a standard and the initial data rate is 48 megabytes per second (Mbps), the controller 12 may refer to Table 1 to find that "RATE_OFDM_54M" is the next MCS rate higher than 48 Mbps. The PHY rate of "RATE_OFDM_54M" is 54 Mbps, and thus the test data rate would be set to 54 Mbps. In other embodiments, the controller 12 may generate the test data rate by selecting an MCS rate several levels higher than the current MCS rate from a data rate lookup table (such as Tables 1-4). The MCS rate may correspond to the signal quality of the communication device 10. The poorer signal quality results in a lower MCS rate. Conversely, the better signal quality results in a higher MCS rate. For instance, the MCS rate "0" corresponds to the worst signal quality, and the MCS rate "9" corresponds to the best signal quality.

In other embodiments, the controller 12 may further increase the initial data rate to generate the test data rate according to received signal strength, signal-to-noise ratio or other signal quality indicators. In some embodiments, the higher the signal quality, the more the controller 12 may increase the test data rate each time.

In Step S208, the controller 12 determines the wireless environment condition according to the transmission result of the test packet. If the transmission of the test packet is successful, it indicates that the wireless environment can support the transmission of the packet at the test data rate. Therefore, the method 200 proceeds to Step S210, the controller 12 selects the test data rate as the selected data rate, and the transceiver 14 uses the test data rate (the selected data rate) to transmit data packets to increase the throughput. However, if the transmission of the test packet fails (unsuccessful transmission), it indicates that the wireless environment is unable to support the transmission of the packet at the test data rate. Therefore, the method 200 proceeds to Step S212. The controller 12 selects the initial data rate as the selected data rate, and the transceiver 14 uses the initial data rate (the selected data rate) to transmit data packets.

Figure 5:
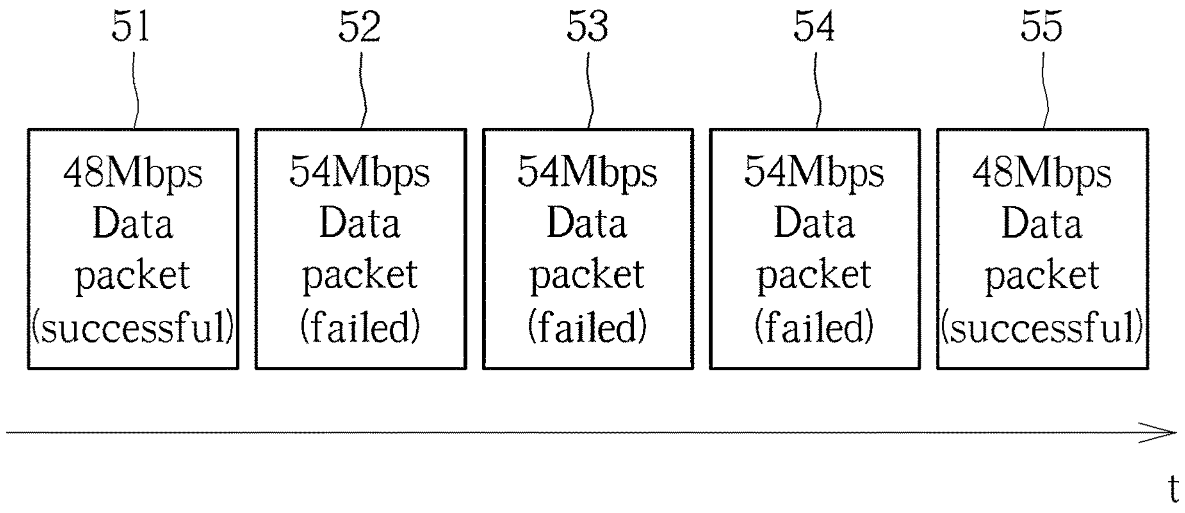
FIG. 5 is a schematic diagram of increasing the packet data rate in the related art.
Figure 6:
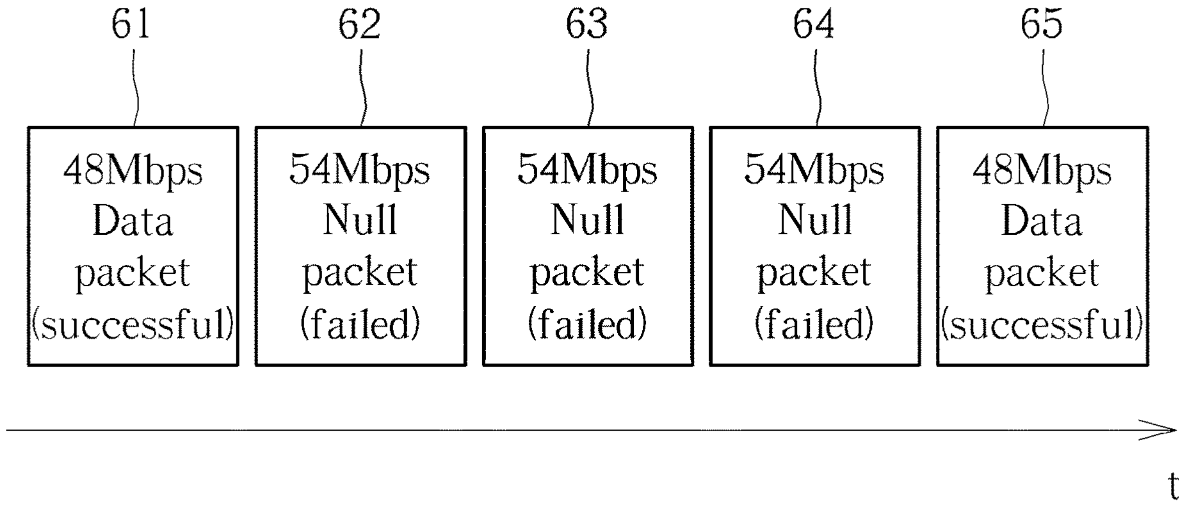
FIG. 6 is a schematic diagram of increasing the packet data rate using the adaptive data rate method in FIG. 2.

FIG. 5 is a schematic diagram of increasing the packet data rate in the related art. FIG. 6 is a schematic diagram of increasing the packet data rate using the adaptive data rate method 200. In FIGS. 5 and 6, the horizontal axes represent time t. Referring to FIG. 5, in the related art, packets 51 to 55 are data packets transmitted in sequence. The data packet 51 is successfully transmitted at a data rate of 48 Mbps, and consequently the communication device attempts to increase the data rate and transmits the data packet 52 at 54 Mbps. However, the transmission of the data packet 52 fails, leading to a retransmission of the data packet 53 at 54 Mbps (retransmission count=1). Yet, the transmission of the data packet 53 also fails, prompting another retransmission of the data packet 54 at 54 Mbps (retransmission count=2). Yet, the transmission of the data packet 54 also fails. At this time, the retransmission count reaches the retransmission limit of 2. Consequently, the communication device reduces the data rate to 48 Mbps and transmits the data packet 55 at 48 Mbps. The data packet 55 is transmitted successfully. The transmissions of the data packets 52 to 54 all fail, only the data packet 55 is transmitted successfully. The throughput of data packets 52 to 55 is 12 megabytes (MB) (=(48M*1542)/(4*1542)), which is less than the initial throughput of 48 MB, resulting in a throughput loss. If the communication device uses block acknowledgment (BA) technology to transmit data packets, the throughput loss will be even greater owing to transmission failure. In the related art, achieving high throughput in complex and unpredictable wireless environments, such as open spaces, is challenging, as the significant throughput loss discourages frequency attempts to increase the data rate.

Referring to FIG. 6, in the embodiment of the present invention, the packets 61 to 65 are transmitted in sequence, where the packet 61 is a data packet, the packets 62 to 64 are null packets, and the packet 65 is a data packet. The data packet 61 is successfully transmitted at an initial data rate of 48 Mbps, and consequently the communication device 10 determines that the current wireless environment is favorable. As a result, the communication device 10 uses the adaptive data rate method 200 to attempt an increase to a test data rate of 54 Mbps, and transmits the null packet 62 at 54 Mbps. However, the transmission of the null packet 62 fails, and thus the communication device 10 retransmits the null packet 63 at the test data rate of 54 Mbps (retransmissions count=1). The transmission of the null packet 63 still fails, and thus the communication device 10 continues to retransmit the null packet 64 at the test data rate of 54 Mbps (retransmissions count=2). The transmission of the null packet 64 also fails. At this time, the retransmission count reaches the retransmission limit of 2. Consequently the communication device 10 determines to use the initial data rate of 48 Mbps to transmit the data packet 65. Finally, the data packet 65 is transmitted successfully. Since only the data packet 65 is successfully transmitted out of the packets 61 to 65, and the null packet has a shorter packet length, the throughput loss is reduced compared to the example in FIG. 5. The throughput of the packets 62 to 65 is 45.52 MB (=(48M*1542)/(28*3+1542)), greater than the throughput "12 MB" in FIG. 5, achieving a high throughput in the complex and unpredictable wireless environments such as open spaces.

FIG. 7 is a flowchart of Step S214 of the rate reduction mechanism in FIG. 2. The rate reduction Step S214 includes Steps S702 to S710. Any reasonable step change or adjustment is within the scope of the disclosure. Steps S702 to S710 are detailed as follows:

Step S702: The transceiver 14 transmits the test packet at the test data rate;

Step S704: The controller 12 determines whether the transmission of the test packet is successful? if so, proceed to Step S706; if not, proceed to Step S708;

Step S706: The transceiver 14 transmits the test packet at the test data rate;

Step S708: The controller 12 determines whether the retransmission count n is less than the maximum number of retransmission count N? if so, proceed to Step S709; if not, proceed to Step S710;

Step S709: The controller 12 increases the retransmission count n; proceed to Step S702;

Step S710: The controller 12 reduces the test data rate; proceed to Step S702.

In Step S702, the controller 12 generates a test data rate according to the initial data rate, and the transceiver 14 transmits the test packet at the test data rate. The test data rate may be less than or equal to the initial data rate. When performing the retransmission, the test data rate may be equal to the initial data rate. After the retransmission is completed, the test data rate may be less than the initial data rate.

In Step S704, the controller 12 determines the wireless environment condition according to the transmission result of the test packet. If the test packet is successfully transmitted, it indicates that the wireless environment is able to support the transmission of the packet at the test data rate. Therefore, the method proceeds to Step S706. In Step S706, the controller 12 determines that the data packet needs to be transmitted, and the transceiver 14 transmits the data packet according to the test data rate, ensuring that the data packet can be transmitted successfully. If the transmission of the test packet fails (unsuccessful transmission), it indicates that the channel condition is unfavorable, and the wireless environment is unable to support the transmission of the packet at the test data rate. Therefore, the method proceeds to Step S708, the controller 12 determines that the test packet needs to be transmitted. Further, in Step S708, the controller 12 determines whether the retransmissions count n is less than the retransmission upper limit N. When retransmission occurs for the first time, the retransmission count n may be 0. During each subsequent retransmission, the retransmission count n may be incremented by 1.

If the retransmission count n is less than the retransmission limit N, the retransmissions continues. The controller 12 increments the retransmission count n by 1 (Step S709) and continues to maintain the test data rate equal to the initial data rate, and then the transceiver 14 transmits the test packet at the test data rate (Step S702).

If the retransmission count n is not less than the retransmission limit N, the retransmissions are completed, and the controller 12 reduces the initial data rate to generate a test data rate (Step S710). In some embodiments, the controller 12 may reduce the initial data rate according to the MCS rate to generate the test data rate. In some embodiments, the controller 12 may search from a data rate lookup table (such as Tables 1 to 4) to obtain the corresponding PHY rate of the next MCS rate lower than the current MCS rate, and reduce the initial data rate to generate the test data rate according to the corresponding PHY rate. For example, if the communication device 10 adopts the IEEE802.11a standard and the initial data rate is 48 Mbps, the controller 12 may find from Table 1 the PHY rate of 36 Mbps corresponding to the MCS rate "RATE_OFDM_36M" next lower than 48 Mbps, and set the test data rate to 36 Mbps. In other embodiments, the controller 12 may generate the test data rate by selecting an MCS rate several levels lower than the current MCS rate from a data rate lookup table (such as Tables 1-4). When the channel condition is unfavorable, the communication device 10 determines to decrease the PHY rate, and transitions the MCS rate from the high MCS level to the low MCS level, corresponding to using a lower modulation and coding scheme for transmission.

In other embodiments, the controller 12 may reduce the initial data rate according to the signal quality to generate the test data rate. The signal quality may be determined according to the MCS rate, the received signal strength, the signal-to-noise ratio or other signal quality indicators. In some embodiments, the lower the signal quality is, the more the controller 12 may reduce the test data rate each time.

Next, the transceiver 14 transmits the test packet at the test data rate (Step S702). The communication device 10 may repeat the sequence of Steps S704, S708, S710 and S702 until the test packet is successfully transmitted. Afterward, the method proceeds to Step S706.

Figure 8:
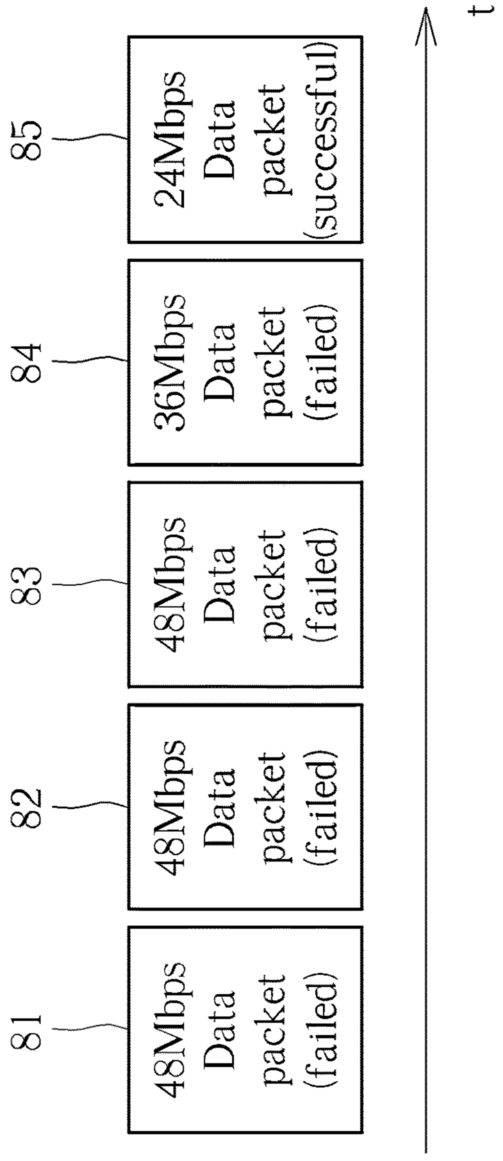
FIG. 8 is a schematic diagram of reducing the packet data rate in the related art.
Figure 9:
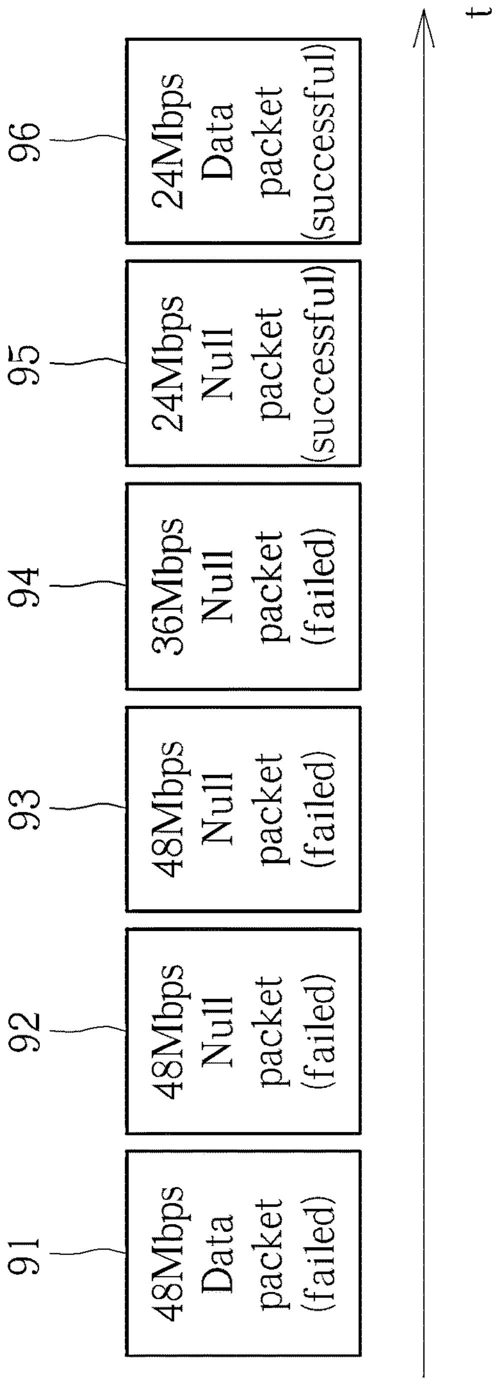
FIG. 9 is a schematic diagram of reducing the packet data rate using the rate reduction mechanism in FIG. 7.

FIG. 8 is a schematic diagram of reducing the packet data rate in the related art. FIG. 9 is a schematic diagram of reducing the packet data rate in Step S214. In FIGS. 8 and 9, the horizontal axis represents time t. Referring to FIG. 8, in the related art, packets 81 to 85 are data packets transmitted in sequence. The communication device initially attempts to transmit the data packet 81 at a data rate of 48 Mbps, but the transmission of the data packet 81 fails. The communication device then sequentially retransmits the data packets 82 and 83 at the data rate of 48 Mbps. However, the transmissions of both the data packets 82 and 83 fail. At this time, the retransmission count n (=2) reaches the retransmission limit N (e.g., N=2). Consequently, the communication device reduces the data rate to 36 Mbps and transmits the data packet 84 at 36 Mbps. Nevertheless, the transmission of the data packet 84 also fails, prompting the communication device to reduce the data rate to 24 Mbps again and transmits data packet 85 at 24 Mbps. This time, the data packet 85 is transmitted successfully. Since only the data packet 85 is transmitted successfully out of the data packets 81 to 85, the overall throughput for the data packets 81 to 85 is 4.8 MB, significantly lower than the original throughput of 48 MB, resulting in a considerable throughput loss. If the communication device uses BA technology to transmit data packets, the throughput loss will be even greater owing to transmission failure, being unfavorable for maintaining the throughput in the complex and unpredictable wireless environments such as open spaces.

Referring to FIG. 9, in the embodiment of the present invention, packets 91 to 96 are transmitted in sequence, where the packet 91 is a data packet, the packets 92 to 95 are null packets, and the packet 96 is a data packet. The communication device 10 initially attempts to transmit the data packet 91 at a data rate of 48 Mbps, but the transmission of the data packet 91 fails, indicating an unfavorable wireless environment. The communication device 10 then attempts retransmissions by sequentially transmits the null packets 92 and 93 at 48 Mbps. However, the transmissions of both the null packets 92 and 93 fail. At this time, the retransmission count n (=2) reaches the retransmission limit N (e.g., N=2). Consequently, the communication device 10 reduces the test data rate to 36 Mbps and transmits the null packet 94 at 36 Mbps. Nevertheless, the transmission of the null packet 94 also fails, prompting the communication device 10 to reduce the test data rate to 24 Mbps, and transmits the null packet 95 at 24 Mbps. This time, the null packet 95 is successfully transmitted, and the communication device 10 then transmits the data packet 96 at 24 Mbps. Since only the null packet 92 and the data packet 96 are successfully transmitted out of the packets 91 to 96, and the throughput of the packets 91 to 95 is 11.58 MB (=(24M*1542)/(2*1542+4*28)), greater than the throughput of 4.8 MB in FIG. 8, being favorable for maintaining the throughput in the complex and unpredictable wireless environments such as open spaces.

The embodiments of the invention disclose an adaptive data rate method for a communication device. When the wireless environment changes, the test packets are utilized to probe a new data rate. Upon successful transmission of the test packets, the new data rate is employed for transmitting the data packets. This approach effectively minimizes the time loss associated with testing and ensures that data packets are transmitted at a rate that has been successfully tested, thereby achieving the high throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adaptive data rate method of a communication device, the communication device comprising a controller and a transceiver coupled to each other, the method comprising:

the controller increasing an initial data rate to generate a test data rate;

the transceiver transmitting a test packet according to the test data rate, a packet length of the test packet being less than a maximum packet length of a data packet;

the controller selecting one from the initial data rate and the test data rate as a selected data rate according to a transmission result of the test packet; and the transceiver transmitting the data packet according to the selected data rate.

2. The method of claim 1, wherein the controller selecting one from the initial data rate and the test data rate as the selected data rate according to the transmission result of the test packet comprises:

if the transmission of the test packet is successful, the controller selecting the test data rate as the selected data rate.

3. The method of claim 1, wherein the controller selecting one from the initial data rate and the test data rate as the selected data rate according to the transmission result of the test packet comprises:

if the transmission of the test packet fails, the controller selecting the initial data rate as the selected data rate.

4. The method of claim 1, wherein the test packet is a null packet.

5. The method of claim 1, wherein the controller increasing the initial data rate to generate the test data rate comprises:

the controller increasing the initial data rate according to a modulation and coding scheme (MCS) rate of the communication device to generate the test data rate.

6. An adaptive data rate method of a communication device, the communication device comprising a controller and a transceiver coupled to each other, the method comprising:

the transceiver transmitting a data packet according to an initial data rate;

if the transmission of the test packet fails, the transceiver transmitting a test packet according to a test data rate, a packet length of the test packet being less than a maximum packet length of the data packet, and the test data rate equal to the initial data rate; and the controller determining whether to transmit the data packet or the test packet according to a transmission result of the test packet.

7. The method of claim 6, wherein the controller determining whether to transmit the data packet or the test packet according to the transmission result of the test packet comprises:

if the transmission of the test packet is successful, the controller determining to transmit the data packet; and the method further comprises:

the transceiver transmitting the data packet according to the test data rate.

8. The method of claim 6, wherein the controller determining whether to transmit the data packet or the test packet according to the transmission result of the test packet comprises:

if the transmission of the test packet fails, the controller determining to transmit the test packet; and the method further comprises:

the transceiver transmitting the test packet according to the test data rate.

9. The method of claim 8, further comprising:

if the transmission of the test packet fails, the controller reducing the test data rate.

10. An adaptive data rate method of a communication device, the communication device comprising a controller and a transceiver coupled to each other, the method comprising:

the transceiver transmitting a data packet according to an initial data rate;

if the transmission of the test packet fails, the transceiver transmitting a test packet according to a test data rate, a packet length of the test packet being less than a maximum packet length of the data packet, and the test data rate being less than or equal to the initial data rate; and the controller determining whether to transmit the data packet or the test packet according to a transmission result of the test packet; wherein the test packet is a null packet.

* * * * *